United States Patent
Chang et al.

(10) Patent No.: US 12,506,683 B2
(45) Date of Patent: Dec. 23, 2025

(54) METHOD OF CABLE REDUNDACY AND DISTRIBUTED CLOCK SYNCHRONIZATION BASED ON ETHERCAT AND MASTER DEVICE THEREOF

(71) Applicant: Delta Electronics, Inc., Taoyuan (TW)

(72) Inventors: Yu Hsin Chang, Taoyuan (TW); Yu Min Chou, Taoyuan (TW); Po Yuan Yang, Taoyuan (TW); Yu Liang Chen, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 10 days.

(21) Appl. No.: 18/604,632

(22) Filed: Mar. 14, 2024

(65) Prior Publication Data

US 2025/0193108 A1 Jun. 12, 2025

(30) Foreign Application Priority Data

Dec. 8, 2023 (CN) .......................... 202311682880.0

(51) Int. Cl.
*H04L 45/24* (2022.01)
*H04L 7/00* (2006.01)
*H04L 45/02* (2022.01)

(52) U.S. Cl.
CPC ............ *H04L 45/24* (2013.01); *H04L 7/0008* (2013.01); *H04L 45/02* (2013.01)

(58) Field of Classification Search
CPC ........ H04L 45/24; H04L 7/0008; H04L 45/02
See application file for complete search history.

(56) References Cited

U.S. PATENT DOCUMENTS

| | | | |
|---|---|---|---|
| 2009/0027509 A1* | 1/2009 | Giesen | H04N 23/90 348/211.3 |
| 2014/0233372 A1 | 8/2014 | Edmiston et al. | |
| 2017/0163440 A1* | 6/2017 | Borkhuis | H04L 12/423 |
| 2022/0166678 A1* | 5/2022 | Ikeo | G05B 19/41855 |

FOREIGN PATENT DOCUMENTS

| | | |
|---|---|---|
| CN | 106170954 | 11/2016 |
| JP | 2017-514378 | 6/2017 |
| JP | 2020-161999 | 10/2020 |

OTHER PUBLICATIONS

Ethercat Slave controller, Hardware Data Sheet Section 1, version 2.2, Jun. 7, 2014 (Year: 2014).*

(Continued)

*Primary Examiner* — Caroline H Jahnige

(57) ABSTRACT

In the initial phase, the master device is configured to disable the connection between the junction device and the last slave device before performing the EtherCAT distributed clock synchronization procedure. After completion, the connection between the junction device and the last slave device is enabled. When a disconnection occurs in a closed loop topology, the junction device can serve to provide a redundant path for forwarding datagrams, thereby achieving cable redundancy. After the disconnection is fixed, the system time delay of each slave device calculated during the initial phase can still be applied without needing to perform again the distributed clock synchronization procedure.

16 Claims, 7 Drawing Sheets

(56) References Cited

OTHER PUBLICATIONS

Hentschel et al. "Automatic Device Scans in EtherCAT Networks With Cable Redundancy", 2015 IEEE 20th Conference on Emerging Technologies & Factory Automation, ETFA, Luxembourg, Luxembourg, Sep. 8-11, 2015, 8 P., Sep. 8, 2015.
Orfanus et al. "Recovery of Distributed Clock in EtherCAT With Redundancy for Time-Drift Sensitive Applications", Proceedings of the 2014 IEEE Emerging Technology and Factory Automation, ETFA, Barcelona, Spain, Sep. 16-19, 2014, 4 P., Sep. 16, 2014.
Prytz et al. "Redundant and Synchronized EtherCAT Network", International Symposium on Industrial Embedded System, SIES 2010, Trento, Italy, Jul. 7-9, 2010, p. 201-204, Jul. 7, 2010.

* cited by examiner

METHOD OF CABLE REDUNDACY AND DISTRIBUTED CLOCK SYNCHRONIZATION BASED ON ETHERCAT AND MASTER DEVICE THEREOF

CROSS REFERENCE TO RELATED APPLICATIONS

This application claims the benefit of priority of Chinese Patent Application No. 202311682880.0, filed on Dec. 8, 2023, the disclosure of which is incorporated herein by reference.

FIELD OF DISCLOSURE

The present disclosure relates to an Ethernet control automation technology (EtherCAT) control method and its master device, and in particular to an EtherCAT control method and its master device that supports both cable redundancy and distributed clock synchronization.

BACKGROUND

Ethernet for Control Automation Technology (EtherCAT) is a fieldbus based on Ethernet. The full-duplex characteristics of Ethernet form the basis of the EtherCAT transmission program. A variety of network topologies, including line, tree, star, ring (or called closed loop) and any combination of them can all be used as an EtherCAT topology. Due to these features, EtherCAT is widely used in automation and industrial manufacturing fields.

EtherCAT technology was developed by the German company Beckhoff and put on the market in 2003. In February 2005, EtherCAT officially became the IEC specification-IEC/PAS 62407, and was integrated into the new generation standard IEC61158 for international fieldbus technology. The International Standards Organization (ISO) has also incorporated EtherCAT into the ISO15745 standard. This technology is currently supported and promoted by the EtherCAT Technology Group (ETG).

EtherCAT adopts a master-slave architecture. Data or commands are transmitted between the master device and the slave devices through EtherCAT datagrams. The structure of an EtherCAT datagram comprises a header field, a data field, and a working counter. By setting the header field, EtherCAT can send a datagram to specific slave devices, or send a broadcast datagram to all slave devices, including "broadcast read datagram" and "broadcast write datagram". When the slave device recognizes the received datagram destinated to it, and successfully processes (reads and/or writes) the data in the datagram, the value of the working counter is increased by 1. Thus, the working counter value can reflect how many slave devices have successfully processed the datagram. Ethernet is the carrier of EtherCAT datagram. One or more EtherCAT datagrams can be put into the Ethernet (IEEE 802.3) standard Ethernet data frame for transmission at a time. For the convenience of following descriptions, "transmitting datagram(s)" refers to the operation of EtherCAT datagram(s) being carried and transmitted through Ethernet. The detailed structures in an EtherCAT datagram for achieving specific functions can be found in the EtherCAT specification and will not be described in detail here.

A brief description of the EtherCAT communication is given as follows: The master device is the only device that is allowed to send datagrams. The datagrams transverse through all the slave devices in the network topology. As a datagram reaches a slave device, the slave device reads the required data and write the data that needs to be transmitted into the datagram, and then the datagram continues its way to the next slave device. When no more next slave device to reach, due to the Ethernet full-duplex feature, the datagram will be returned to the master device along the original path. While EtherCAT supports various network topologies, the described transmission route essentially forms a closed loop: the datagram starts from the master device, goes though the closed loop, and finally returns to the master device.

During the initial phase of EtherCAT operation, the master device needs to establish the entire network topology information so as to obtain the basic information of each slave device and the status of the interconnection between slave devices. The process of establishing network topology information is briefly described as follows: The master device broadcasts a query datagram (a datagram to request slave devices to feed back some information) to all slave devices. Each slave device receives and processes the query datagram. When the query datagram is returned to the master device, the number of slave devices in the network topology is obtained via the working counter value in the query datagram. Next, the master device sends relevant datagrams in sequence to each slave device to initialize each slave device and instruct each slave device to send back the relevant parameters of the slave device. Based on the parameters of each slave device, the master device learns the connection structure of the entire EtherCAT network topology, including how many connection ports each slave device has and which connection port each slave device uses to connect to the next slave. When EtherCAT enters the operational phase, once the master device detects a change in the network topology by comparing the received working count value with the expected one, the master device can perform the above process to obtain the latest network topology information.

In an EtherCAT network, accurate synchronization of each slave device is crucially important for applications needing synchronized operations. Due to the local clock of each slave device in the EtherCAT network differing from each other, each slave device generates a local system clock after compensating and synchronizing the local clock. EtherCAT uses the distributed clock mechanism defined in the IEEE 1588 standard to keep the local system clocks of each slave device consistent and achieve precise synchronization. For the convenience of description, the operation process of this mechanism is called the distributed clock synchronization procedure, which is briefly described as follows. A slave device in the network topology is selected as the reference clock. The master device sends a specific "broadcast write" datagram to each slave device. When the slave device receives the datagram, the current local clock value of the slave device is written into the datagram as a timestamp. When the datagram travels to the last slave device and returns through each slave device again, each slave device writes again the current local clock value as a timestamp into the datagram. Based on these timestamp data, the master device can calculate the difference between the local clock of each slave device and the reference clock, which is called the system time offset, and the time it takes for a datagram to traverse from one slave device to the next one, which is called system time delay. The master device issues datagrams to send these parameters to each slave device, and each slave device stores them for calculating or synchronizing the local system clock. For example, the system time delay is stored in the EtherCAT Slave Controller (ESC) register 0x928 of each slave device. After the EtherCAT system enters the operational phase, the master device periodically sends synchronization datagrams to all slave devices to synchronize the local system clocks of all slave devices. The synchronization datagram carries the current reference clock value. Based on the latest received reference clock value, its own local clock value at the time of receipt, the system time offset, and the system time delay, the local system clock of each slave device is regularly kept within an error range of less than 100 ns.

Another feature of EtherCAT is the cable redundancy. The purpose is that when disconnection occurs, all the slave devices on the network can still be connected to the master device via redundant paths so as to improve the system survivability. The validity of the cable redundancy mechanism depends on the network topology. For line topology, once a disconnection occurs at a point between two adjacent slave devices due to some reasons (such as incorrect IP address, cable damage, or poor port connection), all the devices behind the disconnection point will no longer be able to connect to the master device and cannot be reached by the system. On other hand, when the network topology is a closed loop, a disconnection will make the network topology become two line topologies. After the network topology information being updated, all the slave devices can connect to the master device via one of the line topologies and be utilized by the system. However, if the disconnection is caused by a slave malfunction, this slave device will no longer be utilized by the system even if it has connection capabilities.

FIG. 1 shows a conventional EtherCAT system with a closed loop topology. The conventional EtherCAT system comprises a master device 100 and a plurality of slave devices $S_1, \ldots, S_N$. The master device 100 has two Ethernet media access control (MAC) modules, including Ethernet MAC modules 102 and 103, which are connected to Ethernet ports 104 and 105 respectively. Each Ethernet connection port comprises a transmitting unit (TX) and a receiving unit (RX). Each TX unit of the master device 100 sends a datagram with the same content at the same time along with the respective communication path, which is finally received by the corresponding RX unit. The master device 100 needs to integrate the data of the two Ethernet MAC modules 102 and 103. When a disconnection occurs, for example, the connection between the slave devices $S_2$ and $S_3$ are disconnected, the original closed loop topology becomes two separate line structures, which are connected to the two Ethernet ports 104 and 105 of the master device 100 respectively. Although the cable redundancy is achieved such that each slave device is still connected to the master device 100, but the distributed clock mechanism cannot operate normally. The change of the network topology causes the change of the communication path. Due to that the slave devices $S_3, \ldots, S_N$ can no longer have the reference clock of slave device Si to align to, it causes clock deviation problem in lots of slave devices. That is, when a disconnection occurs, the cable redundancy and the distributed clock synchronization mechanisms cannot both take effect, which cause synchronization problem among the slave devices.

SUMMARY OF DISCLOSURE

In view of this, the present disclosure provides an EtherCAT control method and its master device, which support both cable redundancy and distributed clock synchronization in order to ensure system operation status whenever a disconnection occurs.

The disclosure provides a method of cable redundancy and distributed clock synchronization based on EtherCAT, used by a master device, wherein the master device is connected in series to N slave devices via a junction device. The method comprises the following steps: (1) Send a query datagram to instruct the junction device and the N slave devices to report a plurality of port states, so as to establish a network topology information based on the plurality of port states. (2) Based on the network topology information, determine whether there is a redundant connection, if yes, go to step (3), otherwise go to step (4). (3) Send a first command datagram to disable a connection between the junction device and an N-th slave device among the N slave devices. (4) Perform a distributed clock synchronization procedure to calculate a plurality of system time delays in a redundant mode. (5) Send a second command datagram to enable the connection between the junction device and the N-th slave device, where N is a natural number greater than 1.

Another aspect of the present disclosure further provides an EtherCAT master device, including a connection port, an Ethernet MAC module and a processor. The connection port is configured to connect in series to N slave devices via a junction device. The Ethernet MAC module is connected to the connection port. The processor is coupled to the Ethernet MAC module and configured to perform the cable redundancy and distributed clock synchronization method as described above.

Another aspect of the present disclosure further provides an EtherCAT master device, including a processor configured to perform the cable redundancy and distributed clock synchronization method as described above. The EtherCAT master device can further embed a junction device to bring more commercial integration benefits to the master device hardware.

Compared with related art, the EtherCAT-based cable redundancy and distributed clock synchronization method and its master device provided by the present disclosure have the following advantages: (1) When a disconnection occurs, the present disclosure can perform a cable redundancy mechanism to improve the survivability of the EtherCAT network, as well as to retain the synchronization of a plurality of slave devices; (2) After the disconnection is fixed, the system time delay of each slave device calculated with respect to the original network topology can be directly applied without needing to perform again the distributed clock synchronization procedure.

DETAILED DESCRIPTION

Figure 1:
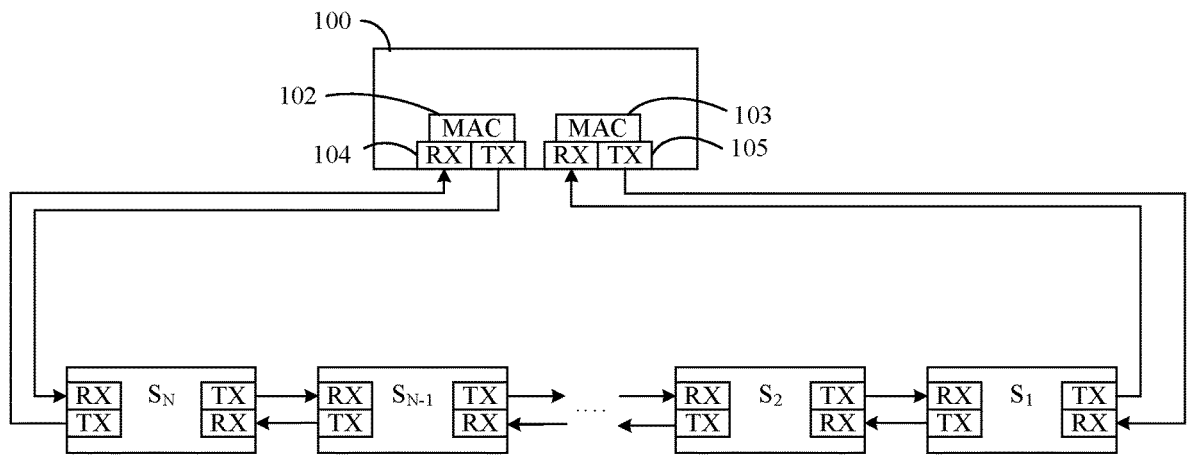
FIG. 1 illustrates a schematic diagram of a conventional EtherCAT system with cable redundancy.

Example embodiments of the present disclosure will now be described more fully with reference to the accompanying drawings, which are capable of being embodied in various forms. These embodiments are provided so that this disclosure will be thorough and complete, and will fully convey the concepts of the example embodiments to a person with general knowledge in the relevant technical field. The drawings are merely schematic illustrations of the invention and are not necessarily drawn to scale. The same reference numerals in the drawings denote the same or similar parts, and thus their repeated description will be omitted.

Figure 2:
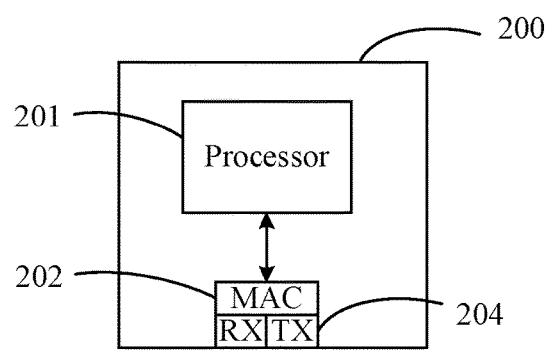
FIG. 2 illustrates a block diagram of an EtherCAT master device according to a first embodiment of the present disclosure.

Please refer to FIG. 2, which is a block diagram of the EtherCAT master device according to a first embodiment of the present disclosure. The master device 200 comprises a processor 201, an Ethernet MAC 202, and an Ethernet port 204, which includes a transmitting unit (TX) and a receiving unit (RX). The processor 201 is coupled to the Ethernet MAC 202, connects to the EtherCAT network through the Ethernet port 204, and performs functions in an EtherCAT network according to the present disclosure.

Figure 3A:
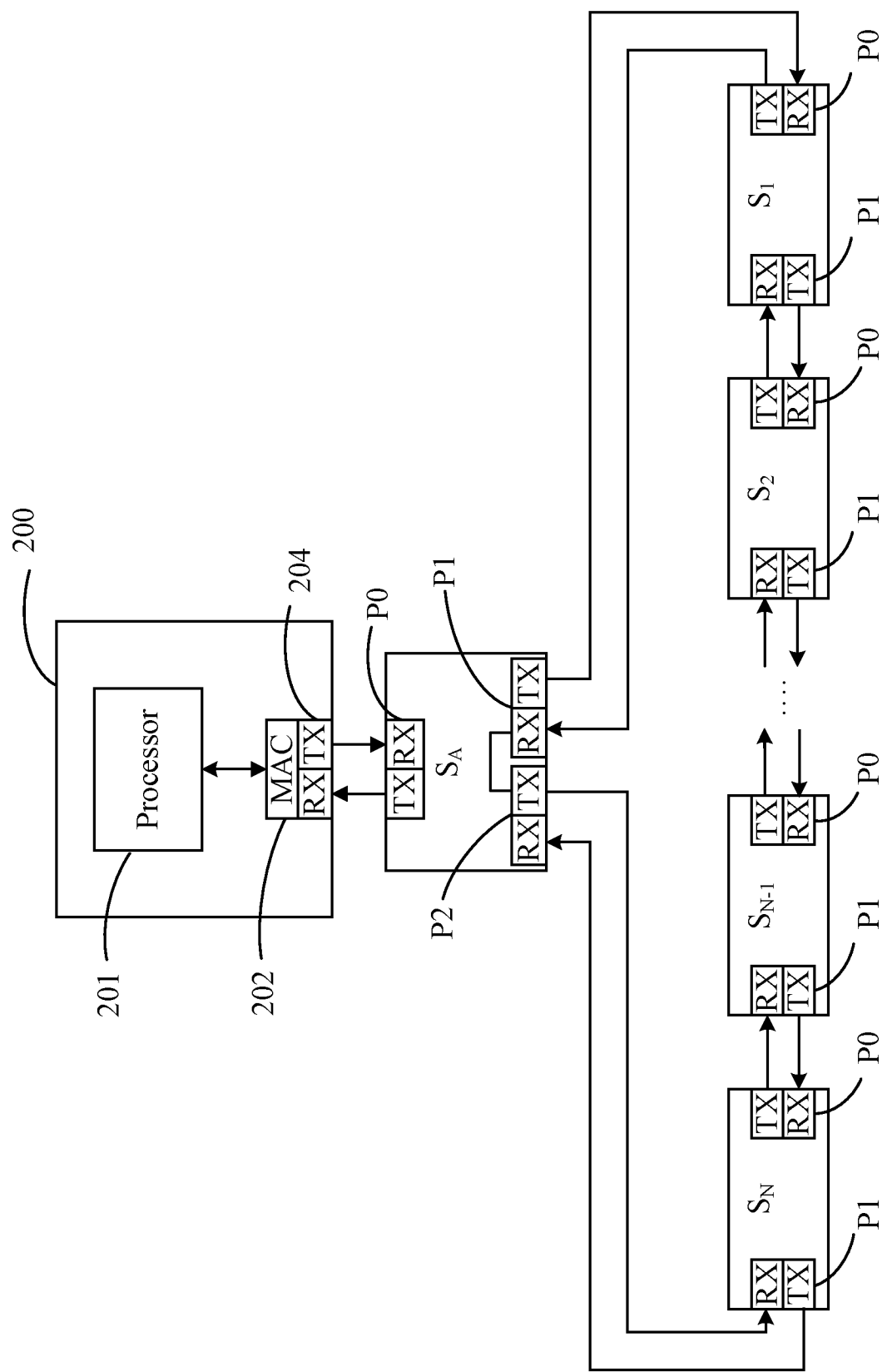
FIG. 3A illustrates a schematic diagram of an EtherCAT system with cable redundancy according to the first embodiment of the present disclosure.

Please refer to FIG. 3A, which is a schematic diagram of an EtherCAT system according to the first embodiment of the present disclosure. The EtherCAT system comprises a master device 200, a junction device $S_A$, and a plurality of slave devices $S_1, \ldots, S_N$. The master device 200 could be, for example, a human machine interface (HMI) or a programmable logic controller (PLC). The junction device $S_A$ and the plurality of slave devices $S_1$ to $S_N$ could be, for example, variable frequency drivers (VFD) or alternating-current servo driver (ASD), in which the junction device $S_A$ and a plurality of slave devices $S_1, \ldots, S_N$ contain all the functions of a standard slave device. Structurally, the junction device $S_A$ has one input port and two output ports, with a total of three connection ports. For example, the connection port P0 is the input port, and the connection ports P1 and P2 are the output ports. Each slave device $S_1, \ldots, S_N$ has two connection ports P0 and P1. The connection port P0 of the junction device $S_A$ is connected to the connection port 204 of the master device 200. The connection port P1 of the junction device $S_A$ is connected to the connection port P0 of the next slave device $S_1$, and the connection port P1 of the slave device $S_1$ is connected to the connection port P0 of the next slave device $S_2$, and so on. Finally, the connection port P1 of the slave device $S_{N-1}$ is connected to the connection port P0 of the next slave device $S_N$, and the connection port P1 of the last slave device $S_N$ is connected to the connection port P2 of the junction device $S_A$. The junction device $S_A$ and the slave devices $S_1, \ldots, S_N$ form a closed loop, and the cable redundancy mechanism can be applied to it. From another perspective, a closed loop can be regarded as a branch in the network topology, and the branch is coupled to the master device 200 of the system via the junction device $S_A$. According to the first embodiment of the present disclosure, the master device 200 utilizes only one Ethernet MAC 202 in hardware to implement the cable redundancy mechanism. As compared with the conventional practice in FIG. 1, wherein the master device 100 needs two Ethernet MACs in order to implement the cable redundancy, the present disclosure has the advantage of saving hardware cost.

It could be understood that FIG. 3A is one of the application examples of using the EtherCAT master device 200 according to the first embodiment of the present disclosure. In other application examples, the junction device $S_A$ could be a slave device that has more than three connection ports but actually only uses three connection ports. Similarly, each of the slave devices $S_1$ to $S_N$ could be slave devices that have more than two connection ports but actually only use two connection ports. For instance, considering the standard slave device in EtherCAT that has four connection ports, the fourth port of the junction device $S_A$ can be connected to other branches in the network topology, and the third and fourth ports of the slave devices $S_1, \ldots, S_N$ can be connected to other branches in the network topology, so as to fully utilize all the connection ports.

Figure 3B:
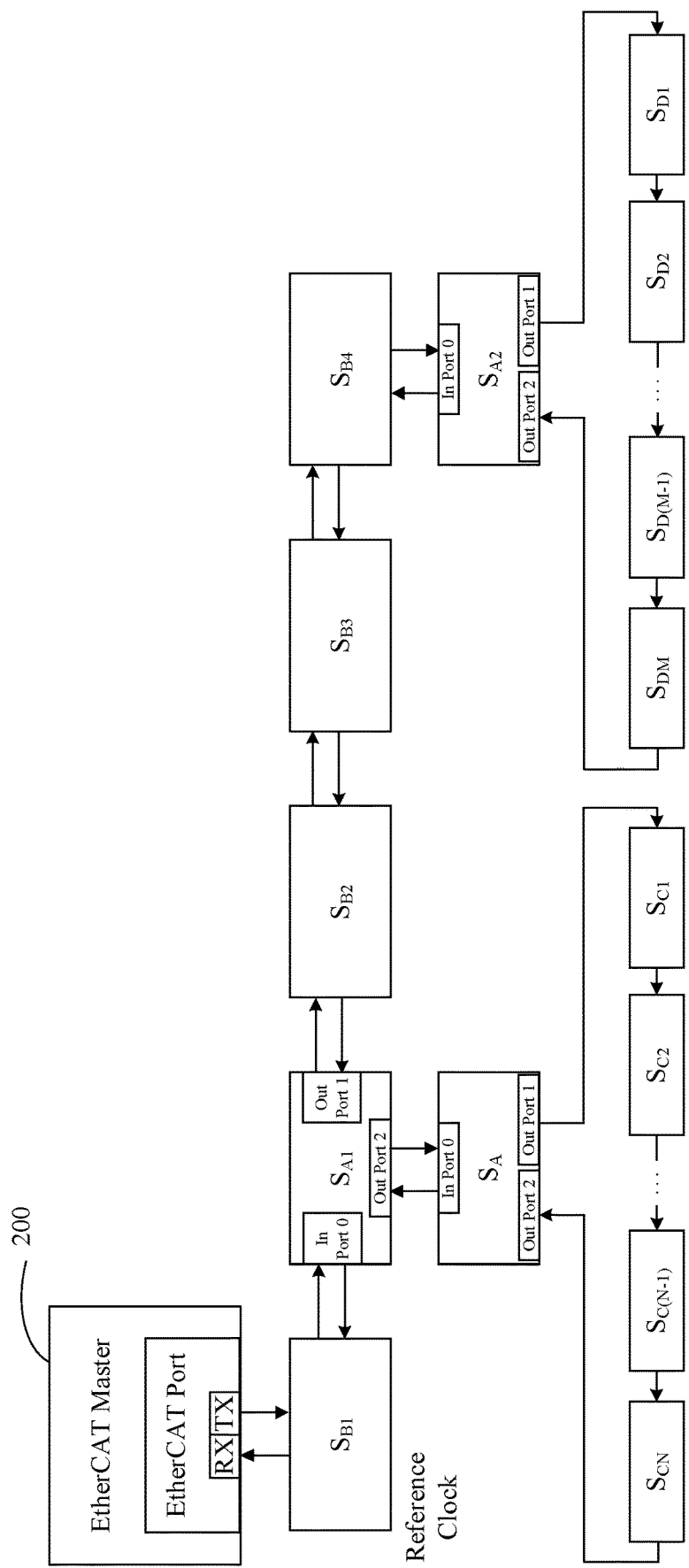
FIG. 3B illustrates a schematic diagram of an EtherCAT system according to an embodiment of the present disclosure.

FIG. 3A, wherein the slave devices $S_1, \ldots, S_N$ form a closed loop, is just an example for convenience of explanation. The present disclosure is also applicable to other network topologies to fit practical applications. Specifically, in industrial automation applications, the product manufacture in production line needs to go through complex processing steps. One processing step can be performed by one or more slave devices, so an appropriate network topology is important for coordinating the processing steps. In one embodiment as shown in FIG. 3B, the EtherCAT system comprises a master device 200, a plurality of junction devices $S_A, S_{A1}, S_{A2} \ldots$, and a plurality of slave devices $S_{B1}, \ldots, S_{B4}, S_{C1}, \ldots, S_{CN}, S_{D1}, \ldots, S_{DM}$, where N and M are natural numbers greater than 1. Structurally, at least one slave device $S_{B1}$ is connected in series between the master device 200 and the junction device $S_A$. At least one junction device $S_{A1}$ is connected in series between the master device 200 and the junction device $S_A$. The junction device $S_{A2}$ is connected with at least one junction device. At least one slave device $S_{B2}, \ldots, S_{B4}$ is connected in series between the junction device $S_A$ and the at least one device $S_{A1}$. Thus, a combination of several line topologies is formed. The junction device $S_A$ is connected in series to a plurality of slave devices $S_{C1}, \ldots, S_{CN}$, and the junction device $S_{A2}$ is connected in series to a plurality of slave devices $S_{D1}, \ldots, S_{DM}$ to form a plurality of closed loop topologies. As a whole, the network topology of the EtherCAT system in FIG. 3B is a combination of multiple line topologies and multiple closed loop topologies, which is a realistic application could have.

Figure 4:
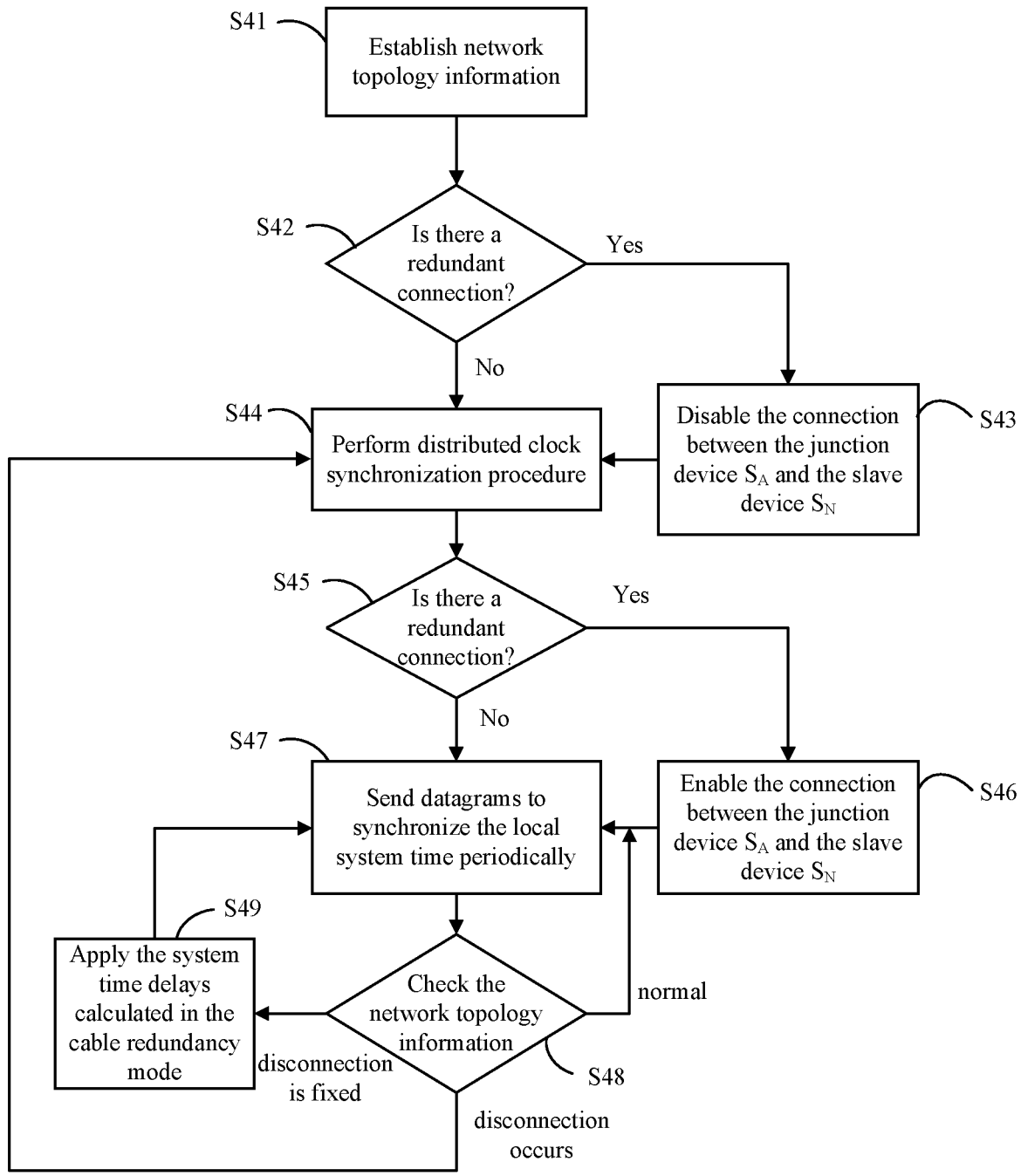
FIG. 4 illustrates an operation flowchart of an EtherCAT master device according to the first embodiment of the present disclosure.

FIG. 4 illustrates an operation flowchart of an EtherCAT master device according to the first embodiment of the present disclosure. For convenience of description, the scenario of FIG. 3A is taken as an example. The EtherCAT master device 200 is configured to perform the operation flowchart of FIG. 4. More specifically, the processor 201 of the EtherCAT master device 200 according to the first embodiment of the present disclosure is configured to perform the following steps:

Step S41: Establish network topology information. According to the EtherCAT specification, during the initial phase, the master device 200 scans all the slave devices in the network to collect network topology information. Specifically, the master device 200 broadcasts a query datagram to instruct the slave devices in the network (such as the junction device $S_A$, a plurality of slave devices $S_1$ to $S_N$) to report port state(s). Then, based on the collected port state (s), the master device 200 establishes network topology information of the connection relationship among the master device 200, the junction device $S_A$, and a plurality of slave devices $S_1$ to $S_N$. This information includes what connection ports these devices have, and through which connection ports these devices are connected to each other.

Step S42: Determine whether there is a redundant connection based on the network topology information. If yes, go to step S43; if not, go to step S44. The master device 200 checks whether the network topology information implies a closed loop to determine whether there is a redundant connection. Taking the scenario in FIG. 3A as an example, whenever the network topology information shows that the connection port P1 of the last slave device $S_N$ is connected to the connection port P2 of the junction device $S_A$, it is determined that there is a redundant connection in the network topology. On the contrary, when the network topology information shows that the last slave device $S_N$ has only one connection port P0 in connected state, and the connection port P1 of the last slave device $S_N$ is not connected to any slave device, that is, the network topology information shows no closed loop, so it is determined that there is no redundant connection in the network topology. It should be understood that if there is no redundant connection in the network topology, the cable redundant function will not be performed even though the master device 200 is capable of doing it.

Step S43: Disable the connection between the junction device $S_A$ and the slave device $S_N$ so as to temporarily change the closed loop topology into a line one. As an example shown in FIG. 3C, step S43 comprises: The master device 200 issues a command datagram to instruct the last slave device $S_N$ to close its connection port P1 and issues another command datagram to instruct the junction device $S_A$ to close its connection port P2. Please note that regardless of whether the junction device $S_A$ and the slave device $S_N$ are connected or disconnected, which affects the equivalent network topology to be different, the datagram route is the same: "master device 200, junction device $S_A$, slave device $S_1$, . . . , slave device $S_N$". Therefore, the system time delay derived from the line topology is also applicable to the closed loop one.

Figure 3C:
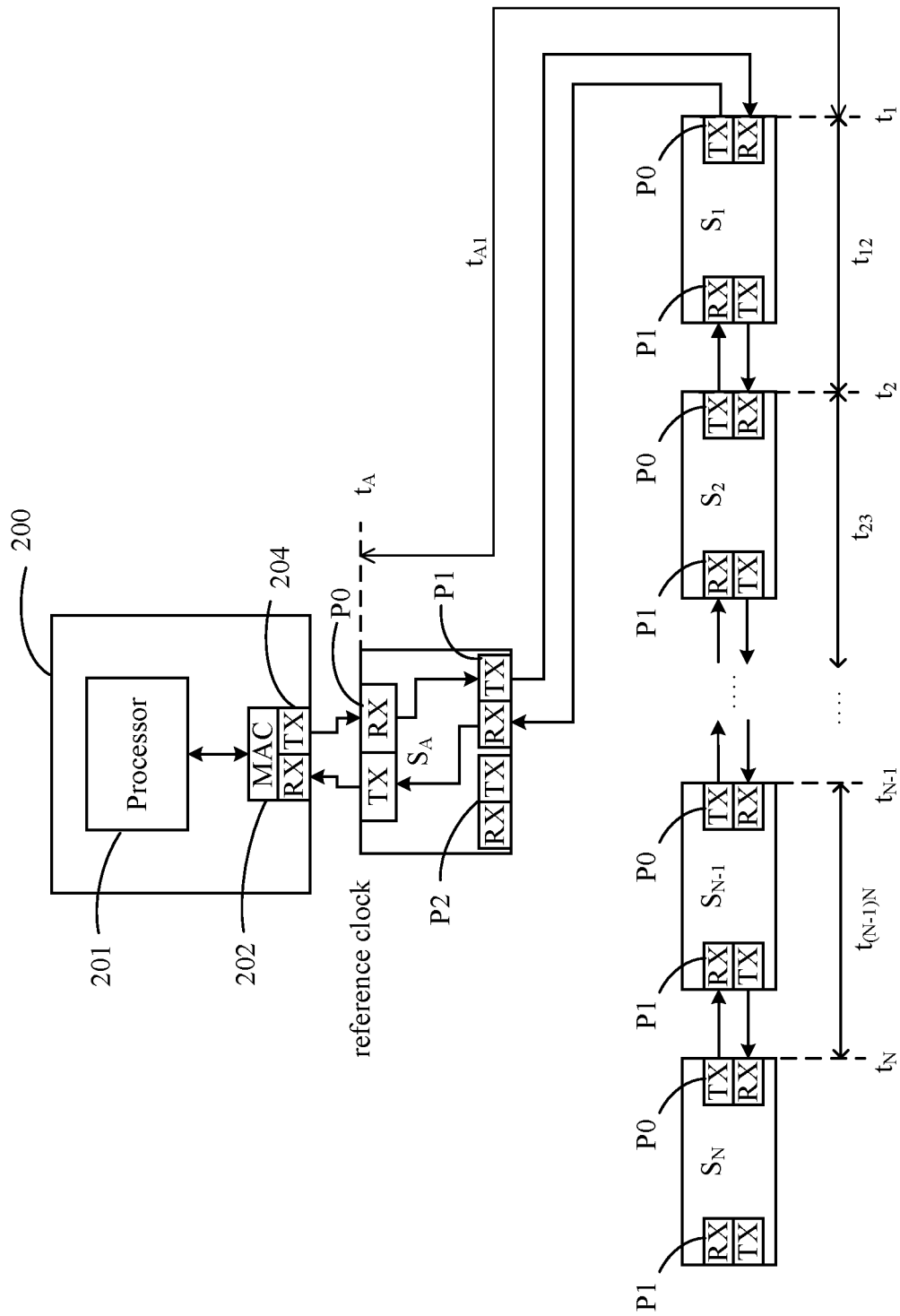
FIG. 3C illustrates a schematic diagram of the EtherCAT system in FIG. 3A wherein the network topology temporarily becomes a line one.

Step S44: Perform a distributed clock synchronization procedure. As shown in FIG. 3C, the master device 200 takes the local clock of the first slave device (for example, the junction device $S_A$) as reference clock, and calculates a plurality of system time delays based on the reference clock, wherein the system time delay between connection ports P0 of two adjacent devices are denoted as $t_{A1}, t_{12}, \ldots, t_{(N-1)N}$, respectively. Specifically, the time difference between the local clock of the master device 200 and the reference clock is the system time offset. After deducting the system time offset, let the time that the datagram sent by the master device 200 arrives at the connection port P0 of the junction device $S_A$ being $t_A$, and the time that the datagram to arrive at the connection port P0 of a plurality of slave devices $S_1$ to $S_N$ being $t_1$ to $t_N$, respectively. Thus it can be seen that the system time delay between the junction device $S_A$ and the slave device $S_1$ is $t_{A1}$, the system time delay between the slave device $S_1$ and $S_2$ is $t_{12}$, and so on. Once finishing the distributed clock synchronization procedure, the master device 200 obtains the following parameters: the system reference time (i.e., the reference clock) and a plurality of system time delays $t_1, t_{12}, \ldots, t_{(N-1)N}$. For details on the distributed clock synchronization procedure, please refer to the EtherCAT standard and it will not be described here. The master device 200 sends the reference clock and the plurality of system time delays $t_1, t_{12}, \ldots, t_{(N-1)N}$ to the junction device $S_A$ and the plurality of slave devices $S_1, \ldots, S_N$, so that the junction device $S_A$ and the plurality of slave devices $S_1, \ldots, S_N$ are synchronized accordingly.

Step S45: Determine whether there is a redundant connection based on the network topology information. If yes, go to step S46; if not, go to step S47.

Step S46: Enable the connection between the junction device $S_A$ and the slave device $S_N$. Since the distributed clock synchronization procedure has been finished in step S44, the master device 200 issues a command datagram to instruct the last slave device $S_N$ to open its connection port P1 and issues another command datagram to instruct the junction device $S_A$ to open its connection port P2 so as to enable the connection between the junction device $S_A$ and the last slave device $S_N$. The network topology is restored to the closed loop one, and then go to step S47.

Step S47: Send datagrams to synchronize the local system time periodically. The master device 200 transmits periodically the present reference clock to all slave devices to synchronize the local system clocks. The details of this step have been described above and will not be repeated here.

Figure 3D:
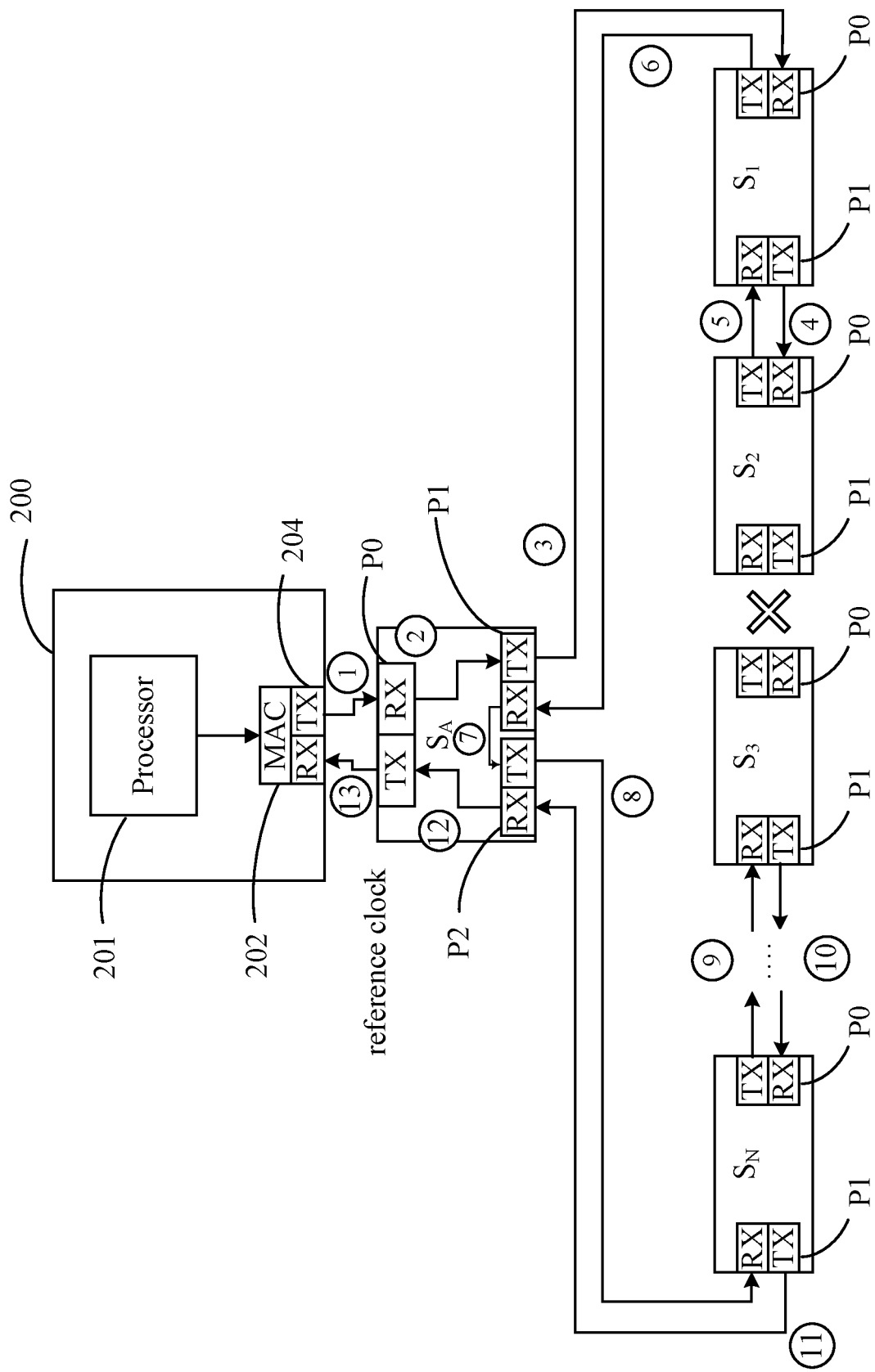
FIG. 3D illustrates a schematic diagram of the EtherCAT system in FIG. 3A for performing a distributed clock procedure in a disconnection situation.

Step S48: Check the network topology information. As an example shown in FIG. 3D, suppose that the master device 200 finds that the state of the connection port P1 of the slave device $S_2$ changes from open to closed. It implies that the connection between the slave device $S_2$ and the next slave device $S_3$ becomes disconnected, and the process will return to step S44 to perform the distributed clock synchronization procedure for the occurrence of a disconnection. The master device 200 takes the junction device $S_A$ as reference clock and sends a datagram via connection port 204. The datagram will, in the first step, reaches the RX connection port P0 of the junction device $S_A$. In the second step, it reaches the TX connection port P1 of the junction device $S_A$. In the third step, it reaches the RX port P0 of the slave device $S_1$. In the fourth step, it reaches the RX port P0 of the slave device $S_2$. In the fifth step, it arrives at the RX port P1 of the slave device $S_1$ from the TX port P0 of the slave device $S_2$. In the sixth step, it reaches the RX port P1 of the junction device $S_A$. In the seventh step, it will be forwarded from the RX port P1 of the junction device $S_A$ to the TX port P2 of the junction device $S_A$. In the eighth step, it reaches the RX port P1 of the slave device $S_N$. In the ninth step, it traverses from the TX port P0 of the slave device $S_N$ finally to the RX port P1 of the slave device $S_3$. In the tenth step, it returns back from the TX port P1 of the slave device $S_3$ to the RX port P0 of the slave device $S_N$. In the eleventh step, it reaches the RX port P2 of the junction device $S_A$. In the twelfth step, it reaches the TX port P0 of the junction device $S_A$ from the RX port P2. And at the end, in the thirteenth step, it returns to the RX port 204 of the master device 200 from the TX port P0 of the junction device $S_A$. It is noted that in the seventh step, the junction device $S_A$ is configured to forward the datagram from the slave device $S_1$ to the slave device $S_N$ so as to form a redundant route for disconnection situation. Although the network topology has changed from the original closed loop to two line structures due to disconnection, the transmission route of the above datagrams is logically equivalent to a closed loop one. The datagram with reference clock information sent by the master device 200 and will traverse through all the slave devices, therefore the EtherCAT distributed clock synchronization procedure is still appliable.

If the master device 200 determines that the network topology state is normal, it returns to step S47 and continues to perform periodic routine step(s). If the master device 200 detects that the state of the connection port P1 of the slave device $S_2$ recovers from indicating disconnected to indicating connected, it means that the disconnection had been fixed, and then goes to step S49.

Step S49: Apply the system time delays calculated in the cable redundancy mode. When the disconnection has been fixed and the network topology recovers, the plurality of system time delays $t_{A1}, t_{12}, \ldots, t_{(N-1)N}$, which associate with the original network topology, recorded in step S44 can be applied directly without needing to perform the distributed clock synchronization procedure again. That is, as long as the recovered network topology is the same as the original one, the system time delays should be the same. After step S49 is completed, it returns to step S47 and continues to perform periodic routine step(s).

Figure 5:
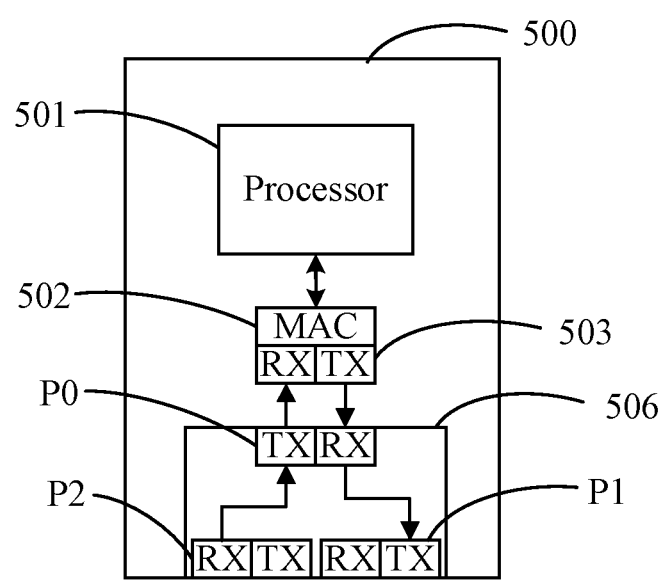
FIG. 5 illustrates a block diagram of an EtherCAT master device according to a second embodiment of the present disclosure.

Please refer to FIG. 5, which is a block diagram of the EtherCAT master device according to a second embodiment of the present disclosure. The master device 500 comprises a processor 501, an Ethernet MAC 502, an Ethernet port 503 and a junction unit 506. The junction unit 506 is basically a slave device having one input port/two output ports and a total of three connection ports P0, P1, and P2. Since the junction unit 506 is already embedded in the master device 500, the port P0 and the Ethernet port 503 may not require relevant port plugin hardware. The TX/RX of the connection port P0 is connected to the RX/TX of the Ethernet port 503, and the connection ports P1 and P2 server as two output ports of the master device 500. The processor 501 is coupled to the Ethernet MAC 502, and connects to the EtherCAT network through the connection ports P1 and P2 of the junction unit 506, and is configured to operate functions in the EtherCAT network according to the present disclosure described above. The operation process is the same as in FIG. 4, and the description will not be repeated here. According to the second embodiment of the present disclosure, by embedding the junction device $S_A$ into the master device 500, the master device 500 will thus have one more feature: capable to provide redundant route for forwarding datagrams. Furthermore, in one embodiment, if the master device 500 is applied to the EtherCAT system in FIG. 3B, it could be understood it is applicable that one or more junction devices, e.g. $S_{A1}$ and $S_{A2}$, can be connected in series between the master device 500 and the first slave device $S_{D1}$ among the plurality of slave devices $S_{D1}, \ldots, S_{DM}$, and one or more slave devices, e.g. $S_{B2}, \ldots, S_{B4}$, can be connected in series between two junction devices, e.g. $S_{A1}$ and $S_{A2}$.

The above are only specific implementations of the present disclosure, but the protection scope of the present disclosure is not limited thereto. Any changes or replacements that can be easily devised by those skilled in the art within the technical scope of the present disclosure should all fall within the protection scope of the present disclosure. Therefore, the protection scope of the present disclosure should be defined by the protection scope of appending claims.

What is claimed is:

1. A method of cable redundancy and distributed clock synchronization based on EtherCAT, used by a master device, wherein the master device is connected in series to N slave devices via a junction device, and the method comprising:
   step (1): sending a query datagram to instruct the junction device and the N slave devices to report a plurality of port states, so as to establish a network topology information based on the plurality of port states;
   step (2): based on the network topology information, determining whether there is a redundant connection, if yes, going to step (3), otherwise going to step (4);
   step (3): sending a first command datagram to disable a connection between the junction device and an N-th slave device among the N slave devices;
   step (4): performing a distributed clock synchronization procedure to calculate a plurality of system time delays in a redundant mode;
   step (5): based on the network topology information, determining whether there is a redundant connection, if yes, going to step (6), otherwise going to step (7);
   step (6): sending a second command datagram to enable the connection between the junction device and the N-th slave device, where N is a natural number greater than 1;
   step (7): sending a periodic datagram to the junction device and the N slave devices to synchronize a plurality of local system times of the junction device and the N slave devices;
   step (8): when the network topology information indicates normal, going back to step (7);
   step (9): when the network topology information indicates a disconnection situation, going back to step (4) to calculate a plurality of system time delays with respect to the disconnection situation; and
   step (10): when the network topology information indicates the disconnection situation is fixed, adopting the plurality of system time delays in the redundant mode, and going back to step (7).

2. The method according to claim 1, wherein each of the N slave devices comprises:
   a first connection port connected to a proceeding device among the N slave devices; and
   a second connection port, connected to a next device among the N slave devices;
   and wherein the junction device comprises:
   a first connection port, connected to the master device;
   a second connection port connected to a first connection port of a first slave device among the N slave devices; and
   a third connection port connected to a second connection port of the N-th slave device.

3. The method according to claim 2, wherein the step (2) comprises:
   determining that there is a redundant connection when the network topology information indicates that the third connection port of the junction device is connected to the second connection port of the N-th slave device.

4. The method according to claim 2, wherein the step (3) comprises:
   sending the first command datagram to instruct the N-th slave device to close the second connection port of the N-th slave device; and
   sending the first command datagram to instruct the junction device to close the third connection port of the junction device.

5. The method according to claim 2, wherein the step (6) comprises:
   sending the second command datagram to instruct the N-th slave device to open the second connection port of the N-th slave device; and
   sending the second command datagram to instruct the junction device to open the third connection port of the junction device.

6. The method according to claim 1, wherein after the step (9), the junction device is configured to forward a datagram from the first slave device to the N-th slave device to serve as a cable redundant route in step (4) to work around the disconnection situation.

7. A master device for EtherCAT, comprising:
a connection port configured to connect in series to N slave devices via a junction device;
an Ethernet media access control module connected to the connection port; and
a processor coupled to the Ethernet media access control module and configured to perform the cable redundancy and distributed clock synchronization method based on EtherCAT according to claim 1.

8. The master device according to claim 7, wherein at least one slave device is connected in series between the master device and the junction device.

9. The master device according to claim 8, wherein at least one junction device is connected in series between the master device and the junction device, and at least one slave device is connected in series between the junction device and the at least one junction device.

10. A master device for EtherCAT, comprising:
a processor;
an Ethernet media access control module coupled to the processor;
a junction unit comprising:
   a first connection port connected to the Ethernet media access control module;
   a second connection port for connecting a first slave device among a plurality of N slave devices that are connected in series; and
   a third connection port connected to an N-th slave device among the N slave devices;
wherein the processor is configured to perform the following steps:
   step (1): sending a query datagram to instruct the junction unit and the N slave devices to report a plurality of port states to establish a network topology information based on the plurality of port states;
   step (2): based on the network topology information, determining whether there is a redundant connection, if yes, going to step (3), otherwise going to step (4);
   step (3): sending a first command datagram to disable a connection between the junction unit and the N-th slave device;
   step (4): performing a distributed clock synchronization procedure to calculate a plurality of system time delays in a redundant mode;
   step (5): based on the network topology information, determining whether there is a redundant connection, if yes, going to step (6), otherwise going to step (7);
   step (6): sending a second command datagram to enable the connection between the junction unit and the N-th slave device, wherein N is a natural number greater than 1;
   step (7): sending a periodic datagram to the junction unit and the N slave devices to synchronize a plurality of local system times of the junction unit and the N slave devices;
   step (8): when the network topology information indicates normal, going back to step (7);
   step (9): when the network topology information indicates a disconnection situation, going back to step (4) to calculate a plurality of system time delays with respect to the disconnection situation; and
   step (10): when the network topology information indicates that the disconnection situation is fixed, adopting the plurality of system time delays in the redundant mode, and going back to step (7).

11. The master device according to claim 10, wherein each of the N slave devices comprises:
a first connection port connected to a proceeding device among the N slave devices; and
a second connection port connected to a next device among the N slave devices.

12. The master device according to claim 11, wherein the processor is further configured to perform the following steps of the step (2):
determining that there is a redundant connection when the network topology information indicates that the third connection port of the junction unit is connected to the second connection port of the N-th slave device.

13. The master device according to claim 11, wherein the processor is further configured to perform the following steps of the step (3):
sending the first command datagram to instruct the N-th slave device to close the second connection port of the N-th slave device; and
sending the first command datagram to instruct the junction unit to close the third connection port of the junction unit.

14. The master device according to claim 11, wherein the processor is further configured to perform the following steps of the step (6):
sending the second command datagram to instruct the N-th slave device to open the second connection port of the N-th slave device; and
sending the second command datagram to instruct the junction unit to open the third connection port of the junction unit.

15. The master device as claimed in claim 10, wherein after the step (9), the junction unit is configured to forward a datagram from the first slave device to the N-th slave device to serve as a cable redundant route in step (4) to work around the disconnection situation.

16. The master device according to claim 10, wherein at least one junction unit and at least one slave device are further connected in series between the master device and the first slave device.

* * * * *